UNITED STATES PATENT OFFICE.

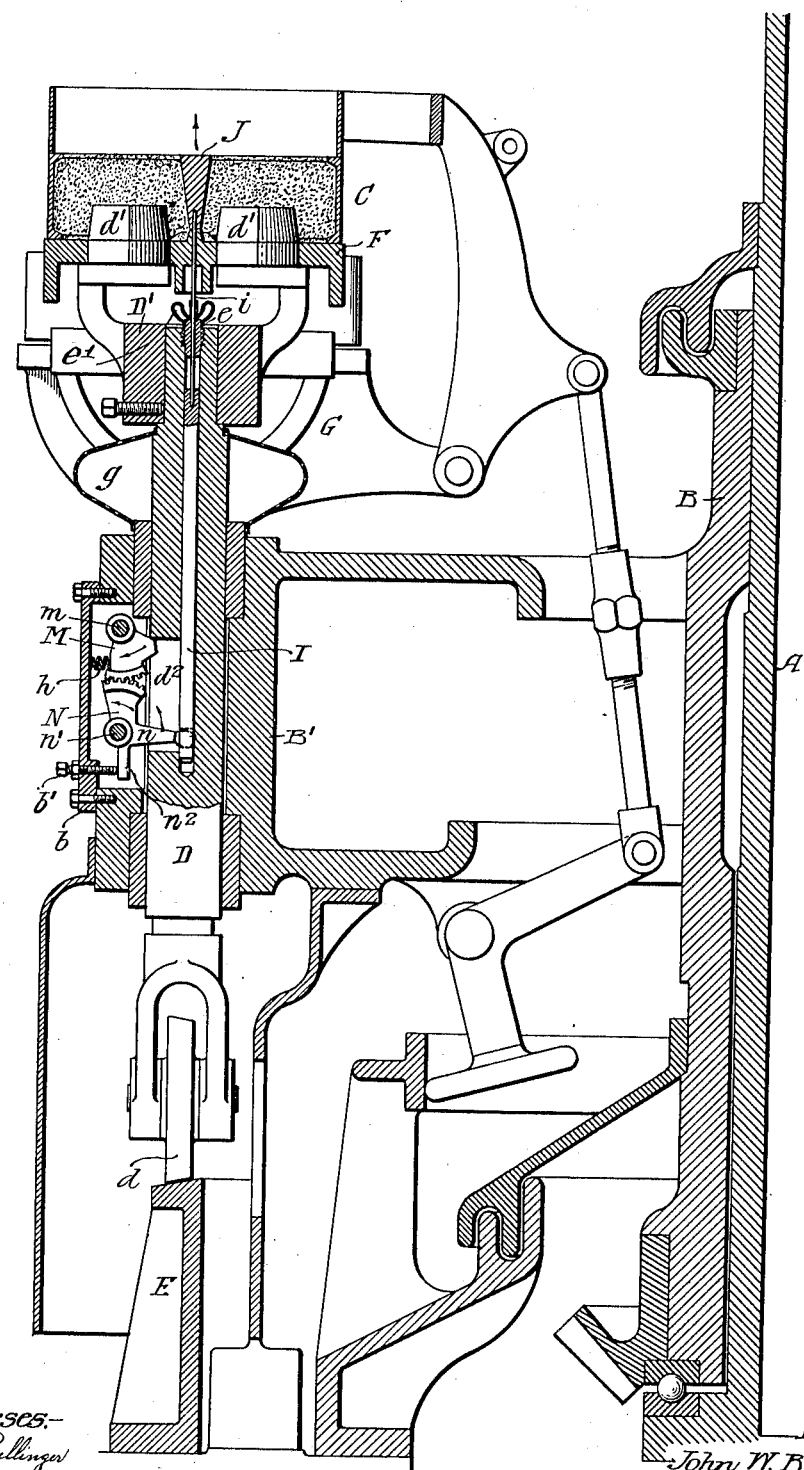

JOHN WILSON BROWN, JR., OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

SPRUE-RAISING MECHANISM FOR MOLDING-MACHINES.

1,022,297. Specification of Letters Patent. Patented Apr. 2, 1912.

Application filed February 2, 1911. Serial No. 606,175.

*To all whom it may concern:*

Be it known that I, JOHN WILSON BROWN, Jr., a citizen of the United States, residing in Philadelphia, Pennsylvania, have invented certain Improvements in Sprue-Raising Mechanism for Molding-Machines, of which the following is a specification.

The object of my invention is to provide means for automatically raising the sprue, which forms the pouring opening in a mold, as the pattern is retracted, so that the sprue can be readily removed before the flask is taken from the machine.

The figure in the accompanying drawing represents a vertical sectional view of sufficient of one form of a molding machine to illustrate the invention.

A is a central standard of a molding machine mounted on a suitable base, and B is the carrier which is arranged to be intermittently rotated in the present instance. This carrier has a series of arms B', only one of which is shown in the drawing, and in each arm is mounted a spindle D. The spindles are controlled by a fixed annular cam E on the base of the machine, and mounted on the lower end of the spindle D is a wheel $d$ which travels on the cam. On the upper end of the spindle is the frame D' carrying the patterns $d'$ which project through the openings in the table F and into the mold C. This table F is supported by a frame G mounted on the arm B' of the carrier. The above construction forms no part of the present invention. The general construction of this particular molding machine is shown in my Patent No. 567,884, dated Sept. 15th, 1896.

Mounted in an opening in the spindle D is a rod I. The spindle is slotted at $d^2$ so as to provide an opening for the passage of one arm $n$ of a segment N pivoted at $n'$ to a stud on the arm B'. The segment has gear teeth which mesh with the teeth of a segment M mounted on a stud $m$ also on the arm B', and between the segment M and the cover plate $b$ is a spring $h$ tending to force the segment toward the spindle D.

As will be noted in the drawing, when the spindle is in the raised position with the patterns projecting into the mold, one edge of the segment projects into the slot $d^2$, so that when the spindle is lowered it will engage the segment M and force it in the direction of the arrow and will cause the segment N to turn on its pivot in the direction of the arrow and lift the rod I. A stop screw $b'$, which extends through the cap $b$, bears upon an arm $n^2$ of the segment N and limits the downward movement of the rod.

On the end of the rod is a long pin $i$, which extends through an opening in the table F and into the lower end of the sprue J. This sprue is tapered so that it can be readily removed from the mold. The rod I passes through a screw plug $e$ in the end of the spindle D and a flexible inclosing cover $e'$ is attached to the plug and to the pin, so as to prevent dust or sand gaining access to the bearing of the pin. There is also a similar flexible cover $g$ mounted between the spindle D and the bearing G, for the same purpose. Thus it will be seen that on the movement of the pattern carrier to retract the pattern, the sprue is raised so that it can be readily grasped by the operator and removed from the mold.

It will be understood that there is one of these sprue raising devices on each arm of the molding machine, and while I have shown it in connection with a machine having a multiplicity of arms or tables, it will be understood that it can be used in connection with a single table without departing from the essential features of the invention. In this case, the mechanism for raising and lowering the pattern carrier may be modified without departing from the essential features of the invention.

I claim:—

1. The combination in a molding machine, of a table, a pattern carrying spindle, a bearing therefor, means for vertically moving said spindle, a sprue mounted above the table, a rod extending through the spindle and carrying the sprue at its upper end, an arm on the bearing engaging the sprue rod, and means actuated by the spindle on its downward movement for operating the arm to raise the rod and its sprue.

2. The combination in a molding machine, of a frame, a table carried thereby, a spindle mounted in the frame, a pattern carried by the spindle, said spindle having a longitudinal and a transverse opening, a sprue rod mounted in the longitudinal opening, two segments geared together and mounted on the frame, one segment connected to the rod, and the other segment actuated by the spindle on its downward movement to lift the sprue clear of the mold.

3. The combination in a molding machine, of a frame, a table supported thereby, said table having openings therein, a spindle mounted in the frame, a frame mounted on the end of the spindle and carrying the patterns which project through the openings in the table and into the mold, said spindle having a longitudinal opening and a lateral slot communicating with the opening at its base, a rod in the opening in the spindle and having a pin which projects through the table, a sprue carried by the upper end of the pin, two segments, one segment having an arm projecting through the lateral slot in the spindle and engaging the pin, the other segment having a portion entering the slot when the spindle is in its raised position, the two segments being geared together, a spring back of the last mentioned segment so as to force it into the slot, and a stop to limit the downward movement of the rod.

4. The combination of a carrying frame, a spindle mounted in the frame, a pattern carried by the spindle, a table having an opening through which the pattern extends, said table being supported by the frame, the spindle having a longitudinal opening and a transverse slot communicating with the opening, a rod mounted in the opening and having a pin at its upper end which passes through an opening in the table, a sprue mounted on the upper end of the pin, two studs mounted on the carrying frame and two segments, one mounted on one stud and the other mounted on the other stud, the two segments having teeth which intermesh, an arm on one segment engaging the rod, said segment having a second arm, an adjustable stop regulating the downward movement of the rod, the first segment having a projection arranged to enter the slot in the spindle, a cap plate for closing the opening in the frame, and a spring mounted between the cap plate and the first mentioned segment, tending to force the segments into the slot of the spindle.

In testimony whereof, I have signed my name to this specification, in the presence of two subscribing witnesses.

JOHN WILSON BROWN, Jr.

Witnesses:
Wm. E. Shupe,
Wm. A. Barr.

---

Copies of this patent may be obtained for five cents each, by addressing the " Commissioner of Patents, Washington, D. C."